United States Patent [19]
Worthington

[11] Patent Number: 5,228,587
[45] Date of Patent: Jul. 20, 1993

[54] FLANGE CAP FOR HIGH VACUUM SYSTEM

[76] Inventor: James N. Worthington, 231-B Otto St., Port Townsend, Wash. 98368

[21] Appl. No.: 980,381

[22] Filed: Nov. 23, 1992

[51] Int. Cl.⁵ .............................................. B65D 45/00
[52] U.S. Cl. ..................................... 220/315; 292/252
[58] Field of Search ....................... 220/315, 319, 320; 215/225, 274, 287; 292/252; 285/314, 315, 316

[56] References Cited

U.S. PATENT DOCUMENTS

| | | | |
|---|---|---|---|
| 2,854,274 | 9/1958 | Gordon | 292/252 |
| 3,617,081 | 11/1971 | Drucker | 292/252 |
| 3,731,837 | 5/1973 | Platts et al. | 292/252 X |
| 4,198,080 | 4/1980 | Carpenter | 285/277 |
| 4,395,051 | 7/1983 | Tonomura | 279/75 |

Primary Examiner—Allan N. Shoap
Assistant Examiner—Nora Stucker
Attorney, Agent, or Firm—Linval B. Castle

[57] ABSTRACT

A cap quickly sealing a distribution pipe of a vacuum chamber having a flange includes a cup shaped body that fits over the flange and contains a sealing disc with O-ring that presses against the flange surface. The cap is locked to the flange by steel balls that partially pass through holes in the body and wedge under the inserted flange, the balls being held or released by an outer sleeve with two interior ball races of a large and a smaller diameter so that drawing up the sleeve will permit the balls to enter the large diameter race and fall back to release a flange in the body.

8 Claims, 1 Drawing Sheet

FLANGE CAP FOR HIGH VACUUM SYSTEM

This invention relates to accessories for high vacuum systems and particularly to a novel quick operating seal for vacuum system flanges such as found on vacuum chambers.

BRIEF SUMMARY OF THE INVENTION

Vacuum systems are extensively used in scientific investigation and in production in a great many different processes that may, for example, involve plastic or metal shaping, freeze drying or metal deposition. For most operations, a vacuum pump is coupled to a chamber which is quite large so that new connections made to the chamber or to a distribution manifold attached to the chamber will not cause undesirable variations in the vacuum pressure in the system.

A distribution manifold or large vacuum chamber obviously has couplings to the various components requiring a vacuum. These connections must be removable and the chamber resealable when the coupling is not in use. Such a removable coupling in the vacuum distribution system includes a standard flange having a flat top surface that extends outward from the chamber pipe to provide a shoulder for attaching a connector from the component. The flange has a standard outside diameter and top connecting surface may be formed to receive a toroidal seal.

When connecting and disconnecting a component from a vacuum chamber it is necessary that the operation be conducted as quickly as possible to prevent gas exchange with the atmosphere. Further, it is most desirable that a sealing cap on an open disconnected flange provide a perfect seal without a costly copper seal and be easily removable. These features are all available with the invention to be disclosed.

Briefly described, the invention is for a vacuum chamber flange cap that enables its quick attachment and removal from a standard flange on a vacuum system. A tubular housing of the cap loosely engages a flange on a vacuum chamber and several steel balls in pockets in the housing and held in by a concentric outer shell lock under the flange up against an "O" ring on a concentric disc that is adjusted against the flange by a spring. Lifting of the concentric outer shell permits the balls to drop from their locked position to immediately release the cap from the flange.

DESCRIPTION OF THE DRAWINGS

In the drawings which illustrate the preferred embodiment of the invention.

DETAILED DESCRIPTION OF THE PREFERRED EMBODIMENT

Figure 1:
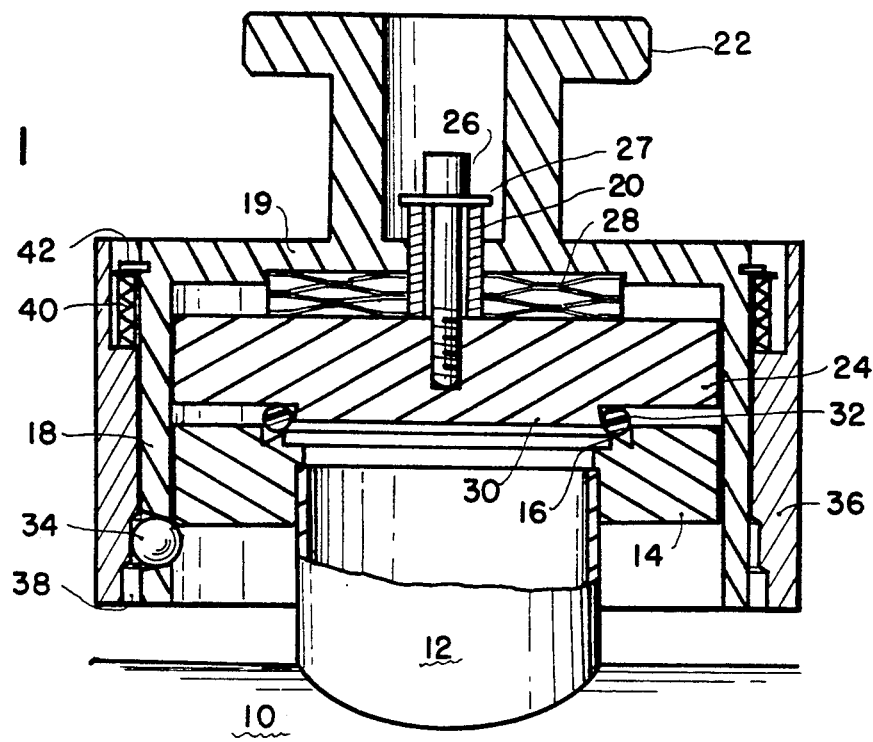
FIG. 1 is a sectional elevational view showing the cap engaging a vacuum flange.

FIG. 1 is a view illustrating a portion of a vacuum distribution manifold or chamber 10 with one connecting port 12 provided with a standard connector flange 14 having a circular top connecting face with appropriate counterboring and sharp concentric rings 16 for receiving a toroidal copper gasket seal. The flange 14 is well-known in the vacuum system trade, is normally provided in many different overall diameters, and is often referred to as a Conflat type flange.

Figure 2:
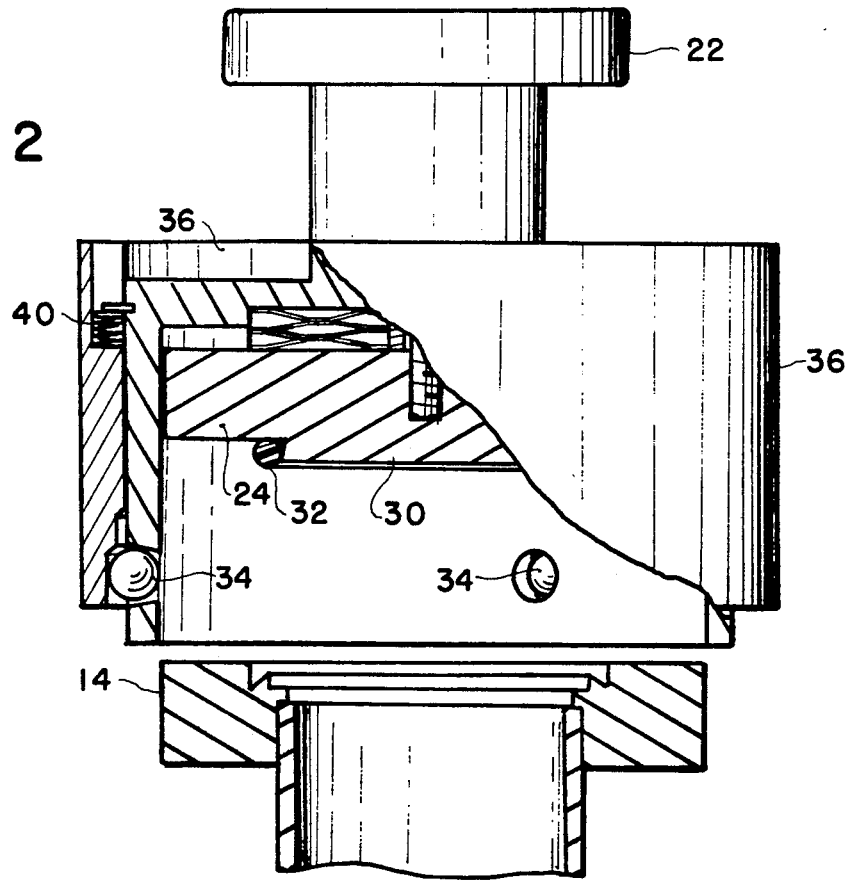
FIG. 2 is a sectional elevation view illustrating the cap being separated from the vacuum flange.

The cap for sealing the flange against vacuum leakage is shown in both figures with FIG. 2 illustrating the cap being either removed from the flange or being applied thereto. The cap includes an inverted cup shaped body 18 having axially located from its closed end 19 a tubular extension terminating in a disclike handle 22. The opposite or open end of the body 18 has an inside diameter slightly larger than the outside diameter of the connector flange 14 so the cap may easily slide over the flange. The length of the interior cup portion of the cup shaped body 18 should be about two inches as will be later discussed.

Contained within the cup shaped body 18 is a stainless steel disc 24 about a half-inch thick and approximately the same diameter as the flange so that it will loosely fit within the body perpendicular to its axis. The top surface of the disc is preferably flat and has an axial threaded hole partially through the disc for receiving the threaded end of a socket headed cap screw 26 that extends through the closed end of the body 19, a concentric spacer that isn't attached to the closed end 19 and a large diameter flat washer 27 into the center of the tubular extension 20. The tubular spacer aids in guiding the dusc 24 and in maintaining it in a position perpendicular to the axis while the flat washer 27 prevents the disc from accidental removal.

Located between the top surface of the disc 24 and the bottom of the body top portion 19 is a wave spring 28 that operates to resiliently urge the disc 24 away from the body top and into contact with the flange. Before vacuum is applied to a chamber, this is valuable for holding the disc in a position to seal a flange when the vacuum is finally initiated.

The bottom surface of the disc 24 is flat except for a short circular extension portion 30 which has a diameter slightly less than the concentric rings 16 that seal against the copper gasket on the flange 14. The walls of the short circular extension portion 30 are preferably angled as shown to secure an elastomer O-ring 32. Thus, when the flange 14 comes into near contact with the disc 28, the O-ring is forced into contact with the concentric sealing surface on the surface of the flange 14 to form a tight seal.

The flange cap is held against a flange by a plurality of at least three steel balls 34 loosely held in holes equally spaced around the circular cup portion of the body 18 and all equidistant from the closed end 19 of the body by an amount that will enable the balls 34 to pass partially through the holes to engage the lower edge of a flange 14 as shown in FIG. 1. The final diameters of the holes must be slightly smaller than the diameters of the steel balls so that the balls cannot completely pass through and it is convenient if the holes are tapered as shown so that a large portion of the balls may pass through the holes without passing their equators.

The balls 34 are held in position in the body holes by an exterior tubular sleeve 36 which has an inside diameter slightly larger than the outside diameter of the body 18 and a length substantially the same as that of the body. The interior surface of one end of the sleeve 36 is cut to produce two races 38 of different diameters so that, when the sleeve is placed over the body with the balls 34 in the holes, the smaller diameter race will force the balls inward to lock against the flange; when the sleeve is raised to a position where the balls align with the larger diameter race, the balls fall back to unlock the flange but remain entrapped in the body as shown in FIG. 2.

The interior surface of the opposite end of the sleeve 36 is cut with a circular slot that receives a wave spring 40 that is held in place by a retainer ring 42 engaged in a circular slot in the body. The spring 40 urges the sleeve downward into a position where the balls 34 are forced into their respective body holes and manually drawing the sleeve up against the force of the spring then releases the balls from their holes.

To install a flange cap on an open flange one would merely hold the cap against the flange by the handle 22 and, with the same hand, axially pull the sleeve 36 so that the balls 34 drop into the race 38 of larger diameter. The cap may then be fully installed and the sleeve 36 released to lock the cap to the flange. The vacuum within the capped chamber will draw the disc 24 and its sealing O-ring 32 against the concentric sealing rings 16 in the surface of the flange to effect a complete vacuum seal between the vacuum chamber 10 and the solid faced disc 24.

I claim:

1. A removable sealing cap for attachment to a vacuum system flange, said cap comprising:
   a tubular body open at its first end and closed at its second end, said body having an inside diameter for loose engagement around the flange;
   a disc within said tubular body, said disc having a diameter slightly less than said body inside diameter and positioned adjacent said closed second end and parallel thereto;
   sealing means on the surface of said disc facing said first end of said body;
   a tubular sleeve slideable around the exterior surface of said tubular body, said sleeve having a first end adjacent the first end of said body and a second end adjacent said closed second end of said body, the interior surface near the first end having cut therein comprising a first race of a first diameter and an adjacent second race of a second diameter that is greater than said first;
   a plurality of at least three spaced circular holes through said body adjacent said first end, said holes having a radially innermost diameter and
   a plurality of at least three spherical balls in said holes, said balls having a diameter slightly greater than the radially innermost diameter of said holes whereby said balls may pass partially through said spaced circular holes, said spherical balls being maintained in said holes by either said first race or second race on the interior of said tubular sleeve.

2. The removable sealing cap claimed in claim 1 wherein said plurality of spaced holes is aligned around said body where said plurality of balls in said holes can lock a vacuum system flange against said sealing means.

3. The removable sealing cap claimed in claim 2 wherein said sealing means is an O-ring positioned to contact sealing rings on the surface of the vacuum system flange.

4. The removable sealing cap claimed in claim 3 wherein said disc is coupled to said body by screw means through said closed second end of said body.

5. The removable sealing cap claimed in claim 4 wherein said screw means is a screw engaging said disc and axially passing through a tubular spacer in said closed second end.

6. The removable sealing cap claimed in claim 4 further including spring means between said closed second end of said body and said disc for urging said disc toward a vacuum system flange in said body.

7. The removable sealing cap claimed in claim 6 further including second spring means coupled between said tubular body and said tubular sleeve for axially urging said sleeve toward the first end of said body where said plurality of balls are urged into said plurality of holes by contact with said first race.

8. The removable sealing cap claimed in claim 7 further including a handle at the end of a tubular extension axially located on the closed second end of said body.

* * * * *